United States Patent
Kusens

(10) Patent No.: US 9,741,227 B1
(45) Date of Patent: Aug. 22, 2017

(54) METHOD AND PROCESS FOR DETERMINING WHETHER AN INDIVIDUAL SUFFERS A FALL REQUIRING ASSISTANCE

(71) Applicant: CERNER INNOVATION, INC., Kansas City, KS (US)

(72) Inventor: Neil Kusens, Sherman Oaks, CA (US)

(73) Assignee: CERNER INNOVATION, INC., Kansas City, KS (US)

( * ) Notice: Subject to any disclaimer, the term of this patent is extended or adjusted under 35 U.S.C. 154(b) by 0 days.

(21) Appl. No.: 14/724,969

(22) Filed: May 29, 2015

Related U.S. Application Data

(63) Continuation-in-part of application No. 13/543,816, filed on Jul. 7, 2012, now Pat. No. 9,129,506.

(60) Provisional application No. 61/507,088, filed on Jul. 12, 2011.

(51) Int. Cl.
*G08B 23/00* (2006.01)
*G08B 21/04* (2006.01)

(52) U.S. Cl.
CPC .................. *G08B 21/043* (2013.01)

(58) Field of Classification Search
None
See application file for complete search history.

(56) References Cited

U.S. PATENT DOCUMENTS

| | | |
|---|---|---|
| 4,857,716 A | 8/1989 | Gombrich et al. |
| 5,031,228 A | 7/1991 | Lu |
| 5,448,221 A | 9/1995 | Weller |
| 5,482,050 A | 1/1996 | Smokoff et al. |
| 5,798,798 A | 8/1998 | Rector et al. |
| 5,915,379 A | 6/1999 | Wallace et al. |
| 5,942,986 A | 8/1999 | Shabot et al. |
| 6,050,940 A | 4/2000 | Braun et al. |
| 6,095,984 A | 8/2000 | Amano et al. |
| 6,160,478 A | 12/2000 | Jacobsen et al. |

(Continued)

FOREIGN PATENT DOCUMENTS

DE 19844918 A1 4/2000

OTHER PUBLICATIONS

Pending U.S. Application by same inventor Neil Kusens, U.S. Appl. No. 14/084,588, filed Nov. 19, 2013, entitled "Method for Determining Whether an Individual Leaves a Prescribed Virtual Perimeter".

(Continued)

*Primary Examiner* — Travis Hunnings
(74) *Attorney, Agent, or Firm* — Shook, Hardy & Bacon, LLP

(57) ABSTRACT

A method for monitoring an individual in a dwelling so as to know when such individual falls or indicates the need of assistance. A plurality of 3D motion and sound sensors are located in the dwelling and provide data to a computerized monitoring system. The sensors are configured to recognize one or more biometric identifiers of the individual being monitored. When the monitoring system detects that the individual has fallen or gestured, a computerized communication system contacts the individual to determine the need to send assistance to help the individual. Where assistance is required the system automatics contacts the previously designated caregiver for the individual and can also contact emergency personnel.

20 Claims, 15 Drawing Sheets

(56) References Cited

U.S. PATENT DOCUMENTS

| | | |
|---|---|---|
| 6,174,283 B1 | 1/2001 | Nevo et al. |
| 6,188,407 B1 | 2/2001 | Smith et al. |
| 6,269,812 B1 | 8/2001 | Wallace et al. |
| 6,287,452 B1 | 9/2001 | Allen et al. |
| 6,322,502 B1 | 11/2001 | Schoenberg et al. |
| 6,369,838 B1 | 4/2002 | Wallace et al. |
| 6,429,869 B1 | 8/2002 | Kamakura et al. |
| 6,614,349 B1 | 9/2003 | Proctor et al. |
| 6,727,818 B1 | 4/2004 | Wildman et al. |
| 6,804,656 B1 | 10/2004 | Rosenfeld et al. |
| 7,323,991 B1 | 1/2008 | Eckert et al. |
| 7,612,679 B1 | 11/2009 | Fackler et al. |
| 7,724,147 B2 | 5/2010 | Brown |
| 7,756,723 B2 | 7/2010 | Rosow et al. |
| 7,908,153 B2 | 3/2011 | Scherpbier et al. |
| 7,945,457 B2 | 5/2011 | Zaleski |
| 7,972,140 B2 | 7/2011 | Renaud |
| 8,237,558 B2 | 8/2012 | Seyed Momen et al. |
| 8,273,018 B1 | 9/2012 | Fackler et al. |
| 8,432,263 B2 | 4/2013 | Kunz |
| 8,529,448 B2 | 9/2013 | McNair |
| 8,565,500 B2 | 10/2013 | Neff |
| 8,620,682 B2 | 12/2013 | Bechtel et al. |
| 8,769,153 B2 | 7/2014 | Dziubinski |
| 8,902,068 B2 | 12/2014 | Bechtel et al. |
| 8,917,186 B1 | 12/2014 | Grant |
| 9,072,929 B1 | 7/2015 | Rush et al. |
| 9,129,506 B1* | 9/2015 | Kusens ............. G08B 21/0446 |
| 9,159,215 B1 | 10/2015 | Kusens |
| 9,538,158 B1 | 1/2017 | Rush et al. |
| 2002/0015034 A1 | 2/2002 | Malmborg |
| 2002/0077863 A1 | 6/2002 | Rutledge et al. |
| 2002/0183976 A1 | 12/2002 | Pearce |
| 2003/0037786 A1 | 2/2003 | Biondi et al. |
| 2003/0070177 A1 | 4/2003 | Kondo et al. |
| 2003/0092974 A1 | 5/2003 | Santoso et al. |
| 2003/0095147 A1 | 5/2003 | Daw |
| 2003/0140928 A1 | 7/2003 | Bui et al. |
| 2003/0227386 A1 | 12/2003 | Pulkkinen et al. |
| 2004/0019900 A1 | 1/2004 | Knightbridge et al. |
| 2004/0052418 A1 | 3/2004 | DeLean |
| 2004/0054760 A1 | 3/2004 | Ewing et al. |
| 2004/0097227 A1* | 5/2004 | Siegel ................ H04B 7/2606 |
| | | 455/431 |
| 2004/0116804 A1 | 6/2004 | Mostafavi |
| 2004/0193449 A1 | 9/2004 | Wildman et al. |
| 2005/0038326 A1 | 2/2005 | Mathur |
| 2005/0249139 A1 | 11/2005 | Nesbit |
| 2006/0004606 A1 | 1/2006 | Wendl |
| 2006/0089541 A1 | 4/2006 | Braun et al. |
| 2006/0092043 A1 | 5/2006 | Lagassey |
| 2006/0107295 A1 | 5/2006 | Margis et al. |
| 2006/0145874 A1 | 7/2006 | Fredriksson et al. |
| 2006/0261974 A1 | 11/2006 | Albert et al. |
| 2007/0085690 A1* | 4/2007 | Tran ...................... A61B 5/103 |
| | | 340/573.1 |
| 2007/0279219 A1 | 12/2007 | Warriner |
| 2008/0002860 A1 | 1/2008 | Super et al. |
| 2008/0004904 A1 | 1/2008 | Tran |
| 2008/0087719 A1 | 4/2008 | Sahud |
| 2008/0249376 A1 | 10/2008 | Zaleski |
| 2009/0091458 A1 | 4/2009 | Deutsch |
| 2009/0099480 A1 | 4/2009 | Salgo et al. |
| 2009/0224924 A1 | 9/2009 | Thorp |
| 2009/0278934 A1 | 11/2009 | Ecker et al. |
| 2009/0322513 A1 | 12/2009 | Hwang et al. |
| 2010/0117836 A1 | 5/2010 | Seyed Momen et al. |
| 2010/0176952 A1 | 7/2010 | Bajcsy et al. |
| 2010/0188228 A1 | 7/2010 | Hyland |
| 2010/0205771 A1 | 8/2010 | Pietryga et al. |
| 2010/0285771 A1 | 11/2010 | Peabody |
| 2011/0018709 A1 | 1/2011 | Kornbluh |
| 2011/0025493 A1* | 2/2011 | Papadopoulos .... A61B 5/02427 |
| | | 340/539.12 |
| 2011/0025499 A1 | 2/2011 | Hoy et al. |
| 2011/0087079 A1* | 4/2011 | Aarts ..................... A61B 7/003 |
| | | 600/300 |
| 2011/0102133 A1 | 5/2011 | Shaffer |
| 2011/0227740 A1 | 9/2011 | Wohltjen |
| 2012/0026308 A1 | 2/2012 | Johnson et al. |
| 2012/0092162 A1 | 4/2012 | Rosenberg |
| 2012/0098918 A1 | 4/2012 | Murphy |
| 2012/0212582 A1 | 8/2012 | Deutsch |
| 2013/0120120 A1 | 5/2013 | Long et al. |
| 2013/0122807 A1 | 5/2013 | Tenarvitz et al. |
| 2013/0184592 A1 | 7/2013 | Venetianer et al. |
| 2013/0309128 A1 | 11/2013 | Voegeli et al. |
| 2013/0332184 A1 | 12/2013 | Burnham et al. |
| 2014/0039351 A1 | 2/2014 | Mix et al. |
| 2014/0070950 A1 | 3/2014 | Snodgrass |
| 2014/0085501 A1 | 3/2014 | Tran |
| 2014/0155755 A1 | 6/2014 | Pinter et al. |
| 2014/0191861 A1 | 7/2014 | Scherrer |
| 2014/0267625 A1 | 9/2014 | Clark et al. |
| 2014/0327545 A1 | 11/2014 | Bolling et al. |
| 2014/0333744 A1 | 11/2014 | Baym et al. |
| 2014/0354436 A1 | 12/2014 | Nix et al. |
| 2014/0365242 A1 | 12/2014 | Neff |
| 2015/0206415 A1 | 7/2015 | Wegelin et al. |
| 2015/0278456 A1 | 10/2015 | Bermudez Rodriguez et al. |
| 2016/0022218 A1 | 1/2016 | Hayes et al. |
| 2016/0267327 A1 | 9/2016 | Franz et al. |

OTHER PUBLICATIONS

Pending U.S. Application by same inventor Neil Kusens, U.S. Appl. No. 14/613,866, filed Feb. 4, 2015, entitled "Method and System for Determining Whether an Individual Takes Appropriate Measures to Prevent the Spread of Healthcare Associated Infections Along With Centralized Monitoring".

Pending U.S. Application by same inventor Neil Kusens, U.S. Appl. No. 14/727,434, filed Jun. 1, 2015, entitled Method for Determining Whether Enters a Prescribed Virtual Zone Using Skeletal Tracking and 3D Blob Detection.

Pending U.S. Application by same inventor Neil Kusens, U.S. Appl. No. 14/575,850, filed Dec. 18, 2014, entitled "Method and Process for Determining Whether an Individual Suffers a Fall Requiring Assistance".

Pending U.S. Application by same inventor Neil Kusens, U.S. Appl. No. 14/599,498, filed Jan. 17, 2015, entitled "Method and System for Determining Whether an Individual Takes Appropriate Measures to Prevent the Spread of Healthcare Associated Infections".

Pending U.S. Application by same inventor Neil Kusens, U.S. Appl. No. 14/611,363, filed Feb. 2, 2015, entitled "Method and System for Determining Whether an Individual Takes Appropriate Measures to Prevent the Spread of Healthcare Associated Infections".

Pending U.S. Application by same inventor Neil Kusens, U.S. Appl. No. 14/623,349, filed Feb. 16, 2015, entitled "Method for Determining Whether an Individual Enters a Prescribed Virtual Zone Using 3D Blob Detection".

Pending U.S. Application by same inventor Neil Kusens, U.S. Appl. No. 14/724,969, filed May 29, 2015, entitled "Method and Process for Determining Whether an Individual Suffers a Fall Requiring Assistance".

Pending U.S. Application by same inventor Neil Kusens, U.S. Appl. No. 13/543,816, filed Jul. 7, 2012, entitled "Method and Process for Determining Whether an Individual Suffers a Fall Requiring Assistance".

Pending U.S. Application by same inventor Neil Kusens, U.S. Appl. No. 14/727,434, filed Jun. 1, 2015, entitled "Method for Determining Whether Enters a Prescribed Virtual Zone Using Skeletal Tracking and 3D Blob Detection".

Pending U.S. Application by same inventor Neil Kusens, U.S. Appl. No. 14/728,762, filed Jun. 2, 2015, entitled "Method for Determining Whether an Individual Leaves a Prescribed Virtual Perimeter".

Pending U.S. Application by same inventor Neil Kusens, U.S. Appl. No. 14/743,264, filed Jun. 18, 2015, entitled "System for Determining Whether an Individual Enters a Prescribed Virtual Zone Using 3D Blob Detection".

(56) References Cited

OTHER PUBLICATIONS

Pending U.S. Application by same inventor Neil Kusens, U.S. Appl. No. 14/743,499, filed Jun. 18, 2015, entitled "System for Determining Whether an Individual Suffers a Fall Requiring Assistance".
Pending U.S. Application by same inventor Neil Kusens, U.S. Appl. No. 14/743,447, filed Jun. 18, 2015, entitled "System for Determining Whether an Individual Suffers a Fall Requiring Assistance".
Pending U.S. Application by same inventor Neal Kusens. U.S. Appl. No. 14/611,363, filed Feb. 2, 2015, entitled "Method and System for Determining Whether an Individual Takes Appropriate Measures to Prevent the Spread of Healthcare Associated Infections".
Pending U.S. Application by same inventor Neal Kusens, U.S. Appl. No. 14/613,866, filed Feb. 4, 2015, entitled "Method and System for Determining Whether an Individual Takes Appropriate Measures to Prevent the Spread of Healthcare Associated Infections Along With Centralized Monitoring".
Tom Mooney, "Rhode Island ER first to test Google Glass on medical conditions", http://www.ems1.com/ems-products/cameras-video/articles/1860487-Rhode-Island-ER-first . . . printed on Mar. 11, 2014.
Non-Final Office Action dated Dec. 30, 2013 in U.S. Appl. No. 13/543,816, 9 pages.
Final Office Action dated Jun. 17, 2014 in U.S. Appl. No. 13/543,816, 15 pages.
Non-Final Office Action dated Dec. 1, 2014 in U.S. Appl. No. 13/543,816, 18 pages.
Non-Final Office Action dated Jul. 16, 2014 in U.S. Appl. No. 14/084,588, 12 pages.
Final Office Action dated Dec. 19, 2014 in U.S. Appl. No. 14/084,588, 24 pages.
Notice of Allowance dated Jun. 5, 2015 in U.S. Appl. No. 13/543,816, 5 pages.
Non-Final Office Action dated Oct. 7, 2015 in U.S. Appl. No. 14/339,397, 16 pages.
Non-Final Office Action dated Mar. 11, 2016 in U.S. Appl. No. 14/575,850, 10 pages.
Non-Final Office Action dated May 23, 2016 in U.S. Appl. No. 14/743,499, 5 pages.
Notice of Allowance dated May 31, 2016 in U.S. Appl. No. 14/743,447, 8 pages.
Notice of Allowance dated Jun. 22, 2016 in U.S. Appl. No. 14/743,447, 4 pages.
Notice of Allowance dated Jun. 27, 2016 in U.S. Appl. No. 14/728,762, 14 pages.
Notice of Allowance dated Jul. 18, 2016 in U.S. Appl. No. 14/743,264, 16 pages.
Notice of Allowance dated Aug. 26, 2016 in U.S. Appl. No. 14/743,447, 5 pages.
Notice of Allowance dated Sep. 19, 2016 in U.S. Appl. No. 14/743,499, 5 pages.
Notice of Allowance dated Oct. 14, 2016 in U.S. Appl. No. 14/743,264, 14 pages.
Notice of Allowance dated Nov. 9, 2016 in U.S. Appl. No. 14/743,264, 14 pages.
Notice of Allowance dated Nov. 14, 2016 in U.S. Appl. No. 14/743,447, 5 pages.
Notice of Allowance dated Mar. 20, 2017 in U.S. Appl. No. 14/613,866, 11 pages.
Non-Final Office Action dated Apr. 5, 2017 in U.S. Appl. No. 14/623,349 15 pages.
Non-Final Office Action dated Apr. 11, 2017 in U.S. Appl. No. 15/285,416, 13 pages.
Notice of Allowance dated Apr. 19, 2017 in U.S. Appl. No. 15/395,716, 5 pages.
Non-Final Office Action dated Apr. 21, 2017 in U.S. Appl. No. 14/757,593, 9 pages.
Final Office Action dated Apr. 28, 2017 in U.S. Appl. No. 14/757,593, 20 pages.
Non-Final Office Action dated Jan. 11, 2017 in U.S. Appl. No. 14/611,363, 19 pages.
Non-Final Office Action dated Feb. 23, 2017 in U.S. Appl. No. 14/757,877, 24 pages.
First Action Interview Preinterview Communication dated Feb. 24, 2017 in U.S. Appl. No. 15/395,716, 5 pages.

\* cited by examiner

Diagnosis Determination

/ - Virtual Safety Rail
◁ - Bed Zone
◁ - Auto Bed Zone (Select Patient)
⊕ - Auto Bed Zone (Auto-select)
▭▾ - Saved Zones
☐ - Clear All

METHOD AND PROCESS FOR DETERMINING WHETHER AN INDIVIDUAL SUFFERS A FALL REQUIRING ASSISTANCE

This application is a continuation-in-part of U.S. application Ser. No. 13/543,816, filed Jul. 7, 2012, which application claims the benefit of and priority to U.S. Provisional Patent Application Ser. No. 61/507,088, filed Jul. 12, 2011, both applications are incorporated by reference in their entireties and for all intended purposes.

1. FIELD OF THE DISCLOSURE

The present disclosure relates generally to monitoring systems and particularly to a preferably home monitoring system to monitor movements by individuals within the home.

2. BACKGROUND

According to recent studies, one out of three adults age 65 and older falls each year with that risk increasing proportionately with age. For adults age 80, one in two will fall each year. These falls are the leading cause of injury related death among those age 65 and older and account for 87% of all fractures for those in this age group. Additionally, for those who fall and are unable to get up on their own, the length of time spent immobile can affect their prognosis. Within 30 to 60 minutes of the fall, compression causes muscle cells to begin breaking down. Other complications include but are not limited to dehydration, pressure sores, hypothermia and pneumonia. Even if the fall does not result in injury to the individual, 47% of non-injured fallers cannot get up without assistance.

SUMMARY OF THE DISCLOSURE

The present disclosure is directed to overcoming the problem of an undetected fall by an individual, such as, but not limited to an elderly person, who is home alone and unable to get up on their own. The present disclosure generally provides for a method that allows caregivers, healthcare providers, skilled nursing facilities, central monitoring companies and other persons to monitor disabled, elderly or other high-risk individuals and obtain automatic notification of falls by such an individual where assistance is required, preferably through the use of skeletal tracking system.

The following definitions can be used in accordance with the present invention.

| | |
|---|---|
| 3D Camera, Motion and Sound Sensor | An electronic device that contains cameras capable of identifying individual objects, people and motion regardless of lighting conditions as well as microphones to detect audio. The cameras can utilize technologies including but not limited to color RGB, CMOS sensors, infrared projectors and RF-modulated light. They may also contain microprocessors and image sensors to detect and process information both sent out and received by the various cameras.<br>The electronic device calculates if there has been a change in location of the person or object of interest over a period of time. As a non-limiting example, an object can be at time T1 located at coordinates (x1, y1, z1) in a picture frame taken by the camera. At time T2 the object is captured by the picture frame taken by the camera at coordinates (x2, y2, z2). Based on this information, motion, speed and direction can be derived utilizing the elapsed time and comparing the two 3D coordinates over the elapsed time. As opposed to conventional motion sensors, which use captured motion to control a camera, the 3D Camera, Motion and Sound Sensor used with the method and system, uses the camera in order to compute the motion. The camera/sensors are preferably continuously on at all times during while the monitoring is occurring, regardless of whether the person or object of interest, or any other object or person is moving or not. The 3D Camera, Motion and Sound sensor can additionally be programmed to lock on a person and can send back to the computerized monitoring system the 3D coordinates of the joints in the person's body and a skeletal outline of the person. As a non-limiting example, a person's right arm can be at time T1 located at coordinates (x1, y1, z1) in a picture frame taken by the camera. At time T2 the right arm is captured by the picture frame taken by the camera at coordinates (x2, y2, z2). Based on this information, motion, speed and direction can be derived utilizing the elapsed time and comparing the two 3D coordinates over the elapsed time.<br>The camera preferably views the entire bed or a large portion of the bed or other area that the patient is resting at (i.e. chair, couch, etc.) simply by its placement in a manner sufficient for the monitored area to be visible to the camera. Thus, the camera does not require any triggering event to cause the camera to begin recording video and/or 3D depth data or transmitting video and/or 3D depth data to the other components of the system for analysis. As the video camera is recording or otherwise transmitting video and/or 3D depth data to the other system components at all times during monitoring, the electronic device is able to immediately track, capture and/or record the monitored individual's movements at all times within the room or monitored area and will be able to provide information as to whether and when the individual begins to move or begins to get up to move. Preferably the 3D Camera, Motion and Sound Sensor records, captures and/or streams video and/or 3D depth data. As video is technically made up of individual picture frames (i.e. 30 frames per second of video), the above reference to picture frames is referring to frames of video. |

|  |  |
|---|---|
|  | Depth sensitivity can come into play with skeletal tracking in order to minimize false alarms, as objects behind and in front of the patient can be effectively ignored. The preferred use of depth as a factor also differentiates the current monitoring system from motion/object detection systems that rely on 2D images. |
|  | The 3D Camera, Motion and Sound Sensor can be located within the room of the patient being monitored and/or potentially just outside of the patient's room. It is connected to the computerized communication and computerized monitoring systems via a data connection (TCP/IP or comparable technology). |
| Computerized Monitoring System | A computer system specifically programmed to monitor activity of the 3D Camera, Motion and Sound sensor. The computerized monitoring system will preferably be located within the patient's room and can be connected to the centralized monitoring station at the facility but can also be located at any physical location so long as a data connection (TCP/IP or comparable technology) ex1sts between the computerized monitoring system, the computerized communication system, centralized monitoring station and/or 3D motion and sound sensor. The computerized monitoring system preferably makes its determinations based on the data received by the 3D Camera, Motion and Sound sensor(s). |
| Computerized Communication System | A computer system is specifically designed and programmed to facilitate communication between the monitored patient and computerized monitoring system in the event a fall or potential is detected by the computerized monitoring system. This system may include, but is not limited to, amplified speakers, microphones, lights, monitors, computer terminals, mobile phones and/or other technologies to allow for the electronic communication to take place. The computerized communication system will preferably be located within the patients room being monitored but certain components of the system are mobile by their nature (i.e. mobile phones, pagers, computers) and can also be located at any location so long as a data connection (TCP/IP or comparable technology) exists between the computerized monitoring system, the computerized communication system, centralized monitoring station and 3D Camera, Motion and/or Sound sensor. |
| System Database | A computer database that stores records, documents or other electronic files of all generated alerts, notifications, confirmation requests, responses, and reconfirmation requests and any other desired information concerning a triggering event or lack of triggering event(s). |
| Caregiver | A relative, friend, individual, company or facility whose purpose it to provide assistance in daily living activities for individuals who are disabled, elderly or otherwise in needs of assistance. |
| Centralized Monitoring Primary Display | A computer display connected to the centralized monitoring station, showing video and audio of all patient rooms connected to the centralized monitoring station. |
| Centralized Monitoring Alert Display | A computer display connected to the centralized monitoring station, showing video and audio of any patient room where a patient or other individual is deemed to have fallen or performed an "at risk" behavior, preferably at the moment such determination is made. |

DETAILED DESCRIPTION

Figure 1:
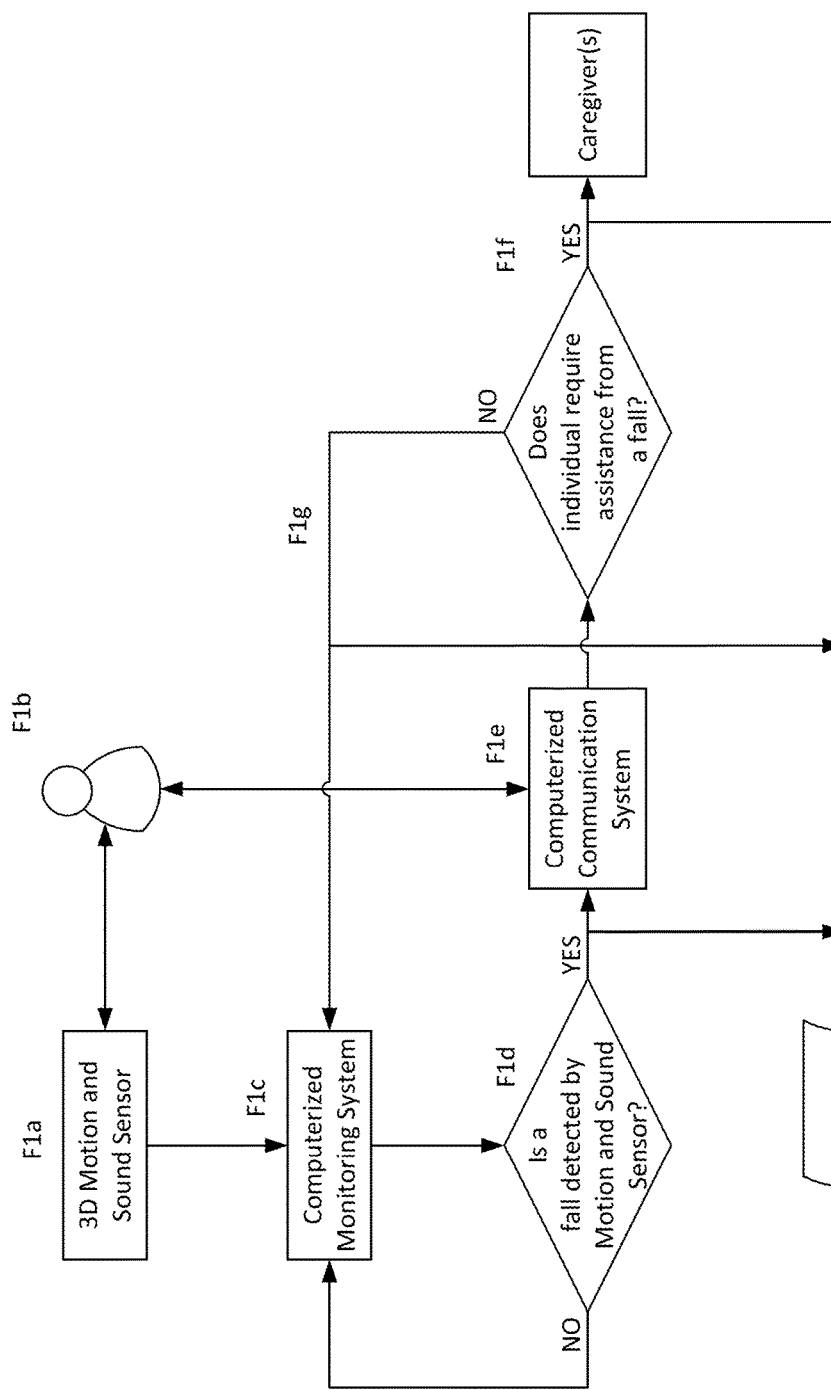
FIG. 1 is a flowchart of the diagnosis determination made in accordance with one non-limiting embodiment of the disclosure.

FIG. 1 is an overview of a diagnosis determination and shows the workflow for monitoring an individual's status through the use of 3D Camera, Motion and Sound sensors as defined above. At step F1a one or more 3D Motion and Sound sensors can be installed in living and rest room areas of the individual's room, home, or other place of residence. The particular rooms in the dwelling that will have sensors and the numbers of sensors that are used are not considered limited to any particular rooms or number of sensors. At step F1b the one or more 3D Camera, Motion and Sound sensors can be configured to recognize the individual using biometric identifiers such as height, distance between points on the body, etc. Preferably, based on information received from the sensor(s), the computerized monitoring system can track skeletal points on a body of the specific individual being monitored in real time.

At step F1c data from preferably one or more "continuously on" the 3D Camera, Motion and Sound sensors can be sent to a computerized monitoring system. At step F1d, if the computerized monitoring system detects a fall based on configurable and specific segments of an individual's body moving or the movement and alignment of the individual from the information/data it received from the sensors, it will alert the computerized communication system to confirm the fall with the individual.

The computerized monitoring system receives the raw data from the one or more 3D Camera, Motion and Sound sensors and makes the determination of a fall based on such data. The one or more 3D Camera, Motion and Sound sensors can be programmed to lock on the individual (i.e. skeleton lock) and can send back to the computerized monitoring system the 3D coordinates of the joints in the individual's body and a skeletal outline of the person. Alternatively, the skeleton locking and tracking can be performed by the computerized monitor system from the video feed received by the one or more 3D Camera, Motion and Sound sensors. The computerized monitoring system is also able to recognize gestures such as waving a hand, rubbing hands together, etc. and uses the information received from the one or more 3D Camera, Motion and Sound sensors to determine if the individual has fallen and/or what if any gestures the individual is doing.

Where the locations to be monitored are outside of a single room, one or more additional 3D Camera, Motion and Sound sensors can be positioned and configured in order to determine (capture) whether the individual has fallen as described above. This captured video can also be stored and/or reviewed by the Computerized Monitoring System when the system makes its determination. Adding one or more additional 3D Camera, Motion and Sound sensors in multiple rooms also allows the system to recognize falls in a larger area such as an individual's residence.

A record can also be electronically entered in a database to record the incident. If no fall is detected the computerized monitoring system will continually monitor the data being sent from the one or more 3D Camera, Motion and Sound sensors. Additionally, the system can also be capable of detecting pre-programmed hand, arm, leg and body gestures or signals to initiate an alert to the computerized communication system. These signals can be used by the monitored individual to alert the system of an emergency or another situation requiring attention, where a fall by the individual has not occurred. Additionally, where a fall is detected, the computerized monitoring system can be programmed to automatically begin, or manually restarted to begin, again monitoring data from the one or more 3D Camera, Motion and Sound sensors.

At step F1e, the computerized communication system will attempt to contact the individual to verify if a fall occurred and/or whether the patient requires assistance whether by phone call, text messaging, speakerphone, or other electronic means of communication. At step F1f, if the individual confirms a fall has occurred and/or the individual requires assistance or fails to respond to the confirmation request in a timely manner, the computerized communication system will notify caregivers or other designated persons (which can also include emergency personnel) that the individual requires assistance. Notification of caregivers can be made through phone call, text messaging, speakerphone systems, email, or other electronic means of communication. The system database can also be updated to reflect actions taken.

At step F1g, if the individual responds indicating a false alarm or they are not in need of assistance, the system database can be updated to reflect such. Additionally, the system can continue to monitor and communicate with the individual in the event the individual requires assistance despite the initial confirmation to the contrary. Additional monitoring can continue for a specified period of time from the initial confirmation, until the system has detected the individual has arisen from the fall, or until the individual provides voice, electronic, gesture or other type of reconfirmation to the system. All data can be stored in the system database.

Preferably, based on information received from the sensor(s), the computerized monitoring system can track skeletal points on a body of the specific individual being monitored in real time. The 3D Camera, Motion and Sound sensors continually capture data concerning the one or more rooms regardless of whether (and independent of) any movements or sounds have occurred in the one or more rooms. Thus, during monitoring, the 3D Camera, Motion and Sound sensors continually capture or receive data at all times and continually feed or send the data to the computerized monitoring system for processing and analysis involved in making the relevant determinations.

The monitored individual or a person/caregiver with the monitored individual can received a message from the computerized communication system which is in communication with the computerized monitoring system to determine whether or not the individual needs assistance. In one embodiment, the computerized monitoring system detects or determines that the individual may have fallen or is about to fall, solely from the video feed forwarded from the one or more 3D Camera, Motion and Sound sensors that shows that the individual has fallen or gestured that he or she needs assistance.

Figure 2:
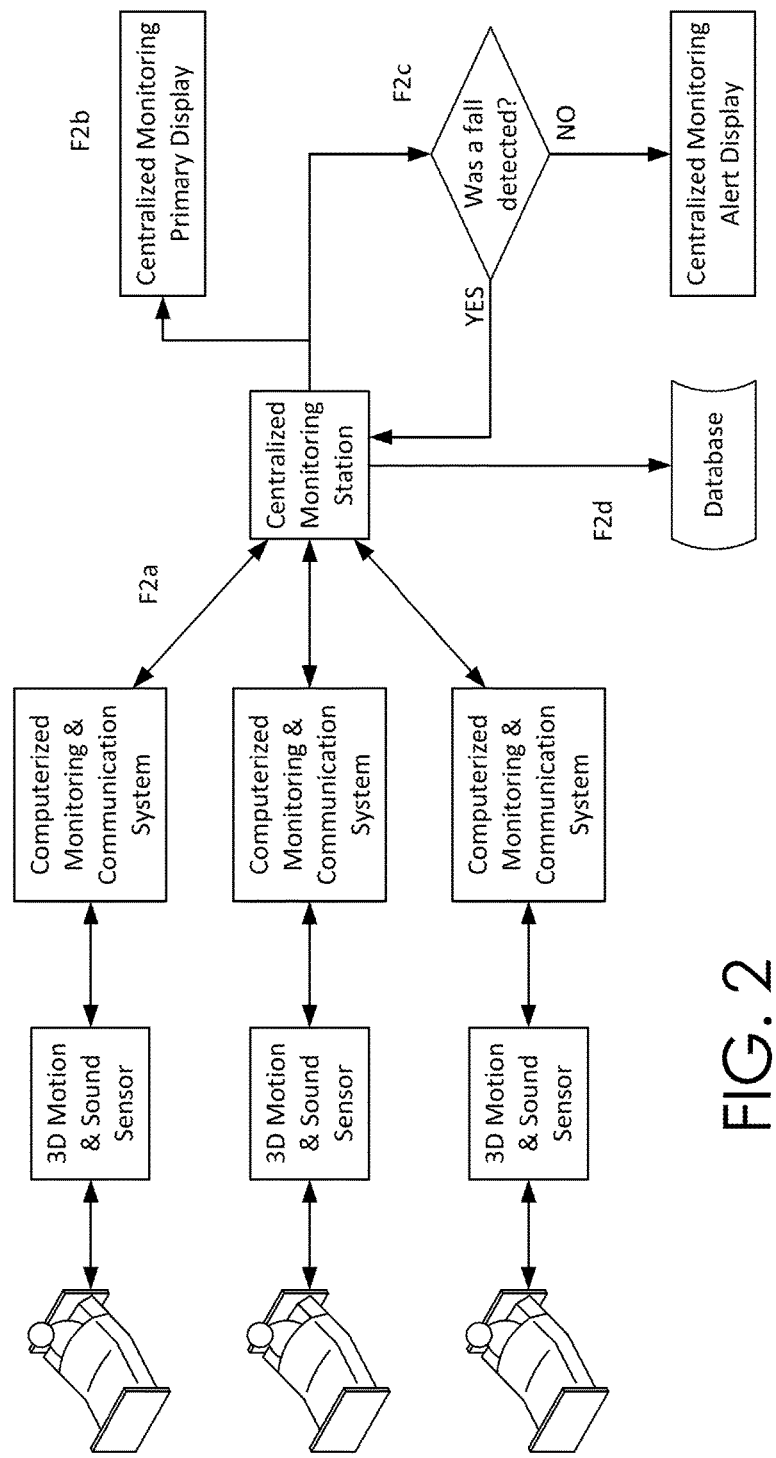
FIG. 2 is a block diagram of the centralizing monitoring and alerting system in accordance with the disclosure.

FIG. 2 illustrates a block diagram for centralized monitoring and alerting and shows the workflow for centralized monitoring and alerting of the central monitoring regarding whether an individual has fallen through the use of 3D Motion and Sound sensors. At step F2a, one or more 3D Motion and Sound sensors are installed in and/or just outside an individual's room, home, hospital room, or other place of temporary or permanent residence and connected to the computerized monitoring and communication systems as described in FIG. 1. The video, audio and alert data can be sent to a centralized monitoring station where the data is aggregated. The computerized monitoring system receives the raw data from the sensors, runs all of the skeletal recognition and fall detection and then sends the audio, video and alert data to the centralized monitoring station. The centralized monitoring station receives and displays this data from one more sensors/computerized monitoring systems. Similar to a grid of cameras being watched on a screen (i.e. where a plurality of camera feeds are viewed on a single screen), the centralized monitoring station aggregates the various video feeds, as it receives and displays information from multiple cameras.

Preferably, the centralized monitoring station receives data at all times from the sensors to allow the various individuals to be constantly monitored at the centralized station regardless of whether or not a fall has been detected.

At step F2b, all video, audio and alert feeds received by the centralized monitoring station can be displayed on the centralized monitoring primary display. Alternatively, multiple centralized monitoring primary displays can be utilized based on the quantity of rooms to be monitored at a given time. At step F2c, when the centralized monitoring system receives an alert from any of the computerized monitoring and communication systems indicating that an individual in any of the monitored rooms or other locations has fallen, the video, audio and alert information is displayed on the Centralized Monitoring Alert Display.

An alert can be represented in one or more different types of physical configurations. It can be a visual queue on screen at the Centralized monitoring system such as the specific camera view flashing or being highlighted in a color to draw attention to it (See FIG. 16). It can be an audible sound (voice or alarm type sound) at the centralized monitoring station, an audible sound at the computerized monitoring system attached to the camera sensor, a text message, an email, turning on a light or even running a program on a computer.

Should the centralized monitoring station receive alerts from more then one of the computerized monitoring and communication systems indicating that an individual in a monitored room or location has fallen, the centralized monitoring alert display will display the video, audio and alerting information from all such instances at the same time. If no alert is received by the centralized monitoring station, nothing is displayed on the Centralized Monitoring Alert Display. Preferably, all patient rooms are displayed and visible on the central monitoring primary display (FIG. 16) whether alerting or not. When an alert is generated, attention is drawn to the particular camera and a duplicative display of the alerting camera can be displayed on a second separate computer monitor (i.e. centralized monitoring alert display) (See FIG. 16). At step F2d, an electronic record of any alerts received by the Centralized Monitoring Station can be stored in an electronic database, which is in communication with the Centralized Monitoring Station.

Figure 3:
FIGS. 3 though 15 illustrate various screen shots for configuring the system for operation including defining fall zone and alert types.

FIGS. 3 through 15 illustrate several set up screen shots for configuring the fall zone and alert types. In FIG. 3, the bed and fall zone can be configured for a given or specific 3D Motion and Sound Sensor. To begin configuration, the user can hover over the 3D Motion and Sound Sensor video window with the cursor, right-click, select plugin and then select configure plug-in. A window will popup showing the 3D Motion and Sound Sensors' feed. The user selects the icon for the type of zone they wish to draw, which as a non-limiting example and illustrative purposes, can be a bed zone and fall zone (See FIG. 4).

Figures 4, 5:
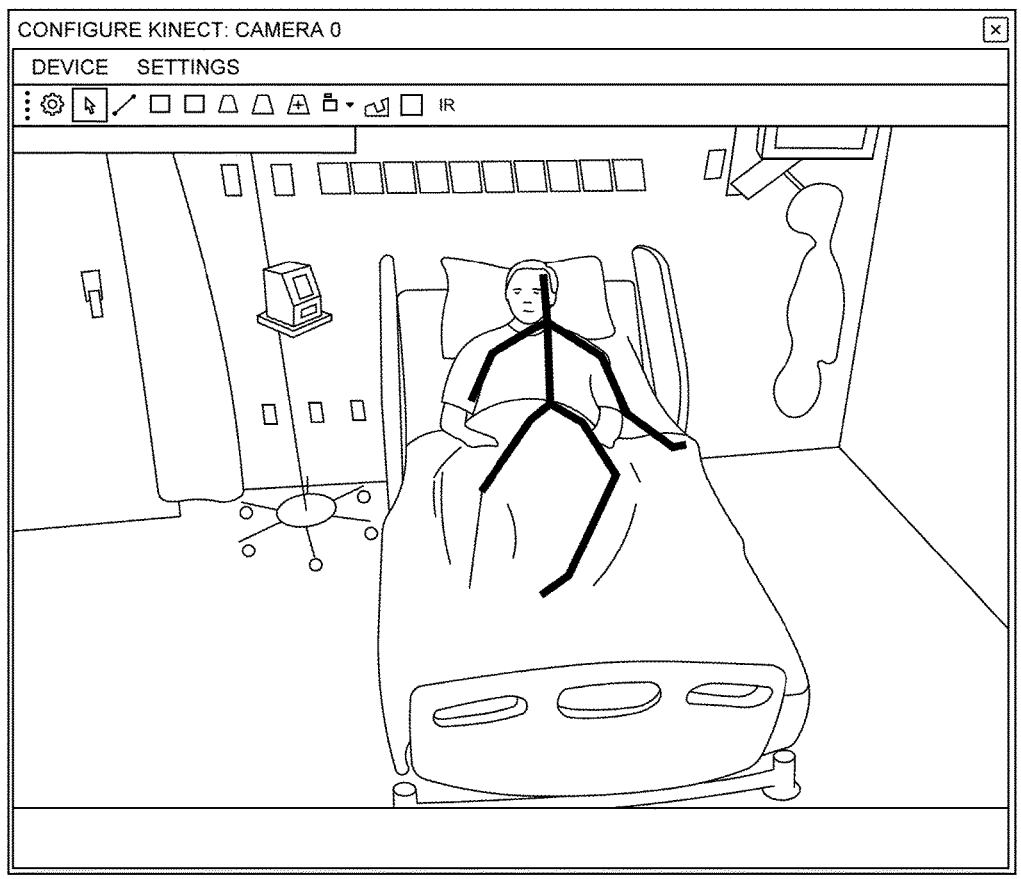

As non-limiting examples, the icons that appear on the screen for selection can include the following symbols shown in FIG. 5. In this non-limiting example, in no particular order, some of the icons include, Bed Zone, Auto Bed Zone (Select Patient), Auto Bed Zone (Autoselect), Saved Zones, Fall Zone and Clear All.

Figure 6:
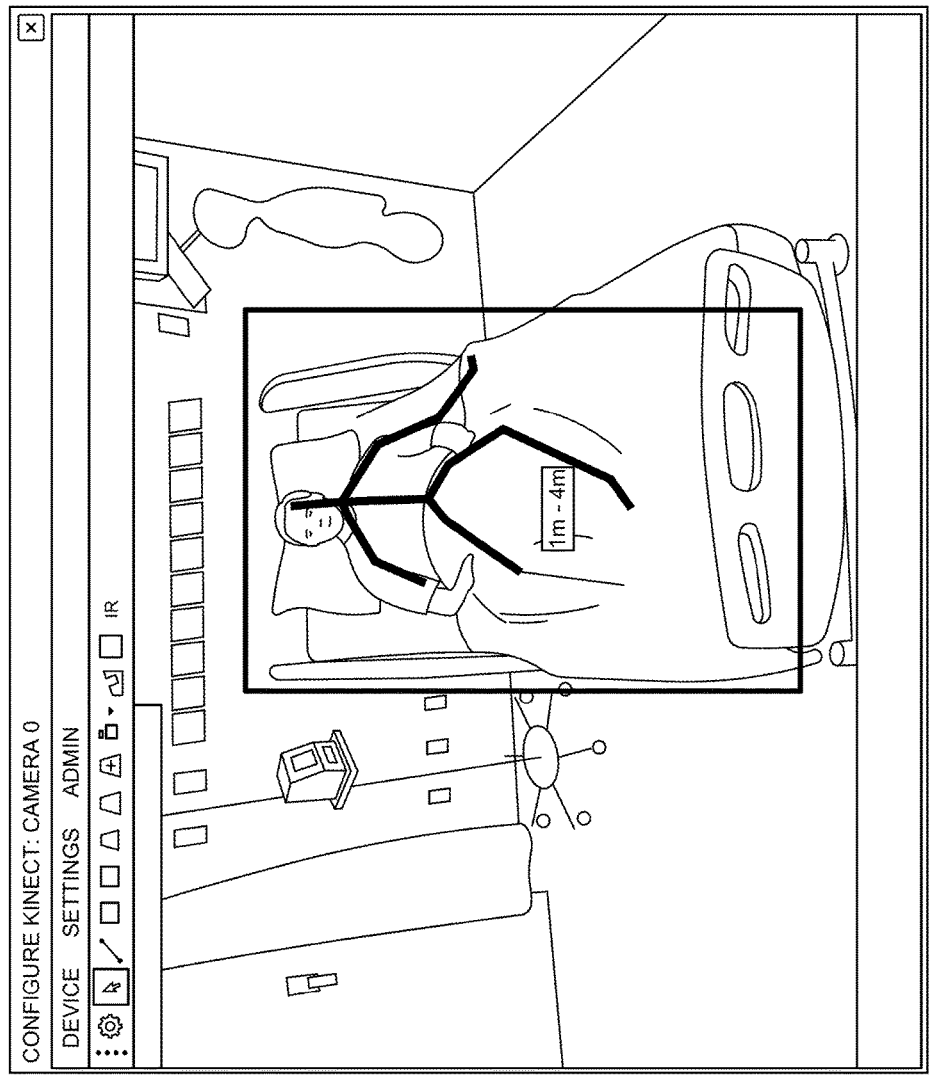
Figure 8:
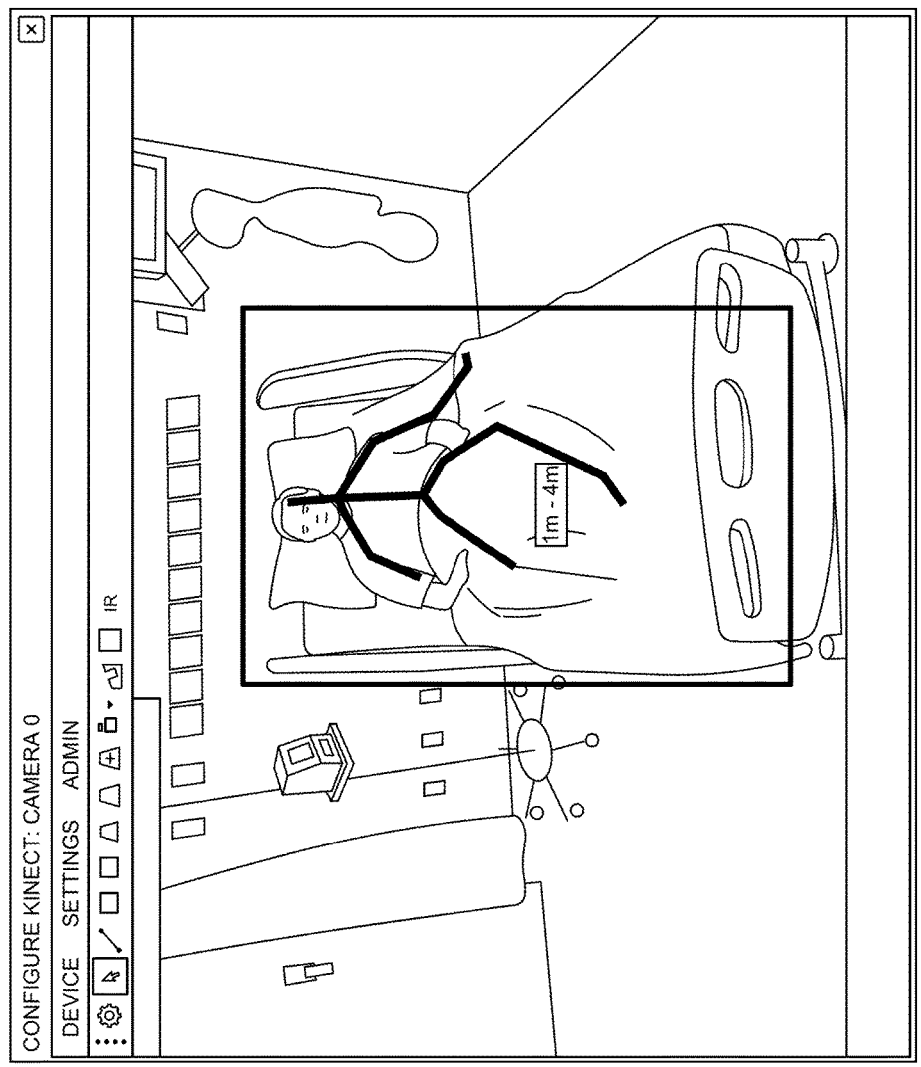

As seen in FIG. 6, to place a zone, the user clicks on the screen where he or she would like to start the zone. Then, the cursor is moved to the corner point for zone and clicked again. The user continues to select additional points until the zone is drawn to the user's satisfaction. Preferably, the user clicks on the round end point of the beginning of the zone to complete the zone (See FIG. 6). When the zone has been completed, the zone can appear and a depth range box (i.e. square, rectangle, etc. disposed over the patient on the screen) can be provided on the screen, such as, but not limited to, in the middle of the screen or zone (see FIG. 8), though any location on the screen is considered within the scope of the invention. As seen in FIG. 8, upon completion the zone appears and has a depth range box preferably in the middle.

Figure 7:
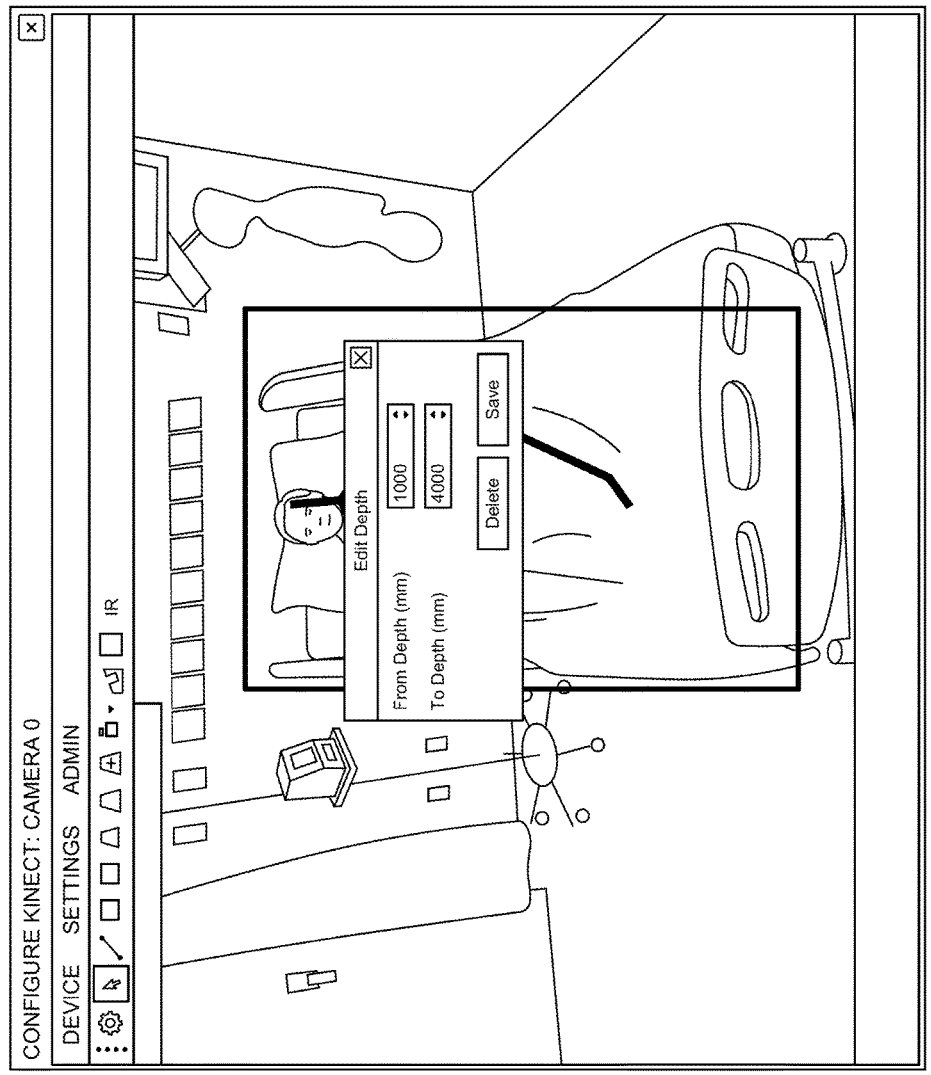

As seen in FIG. 7, the user can adjust the depth range for any given zone. By preferably double clicking on the depth range box or by other conventional selection methods an Edit Depth window can appear. The user can enter in the depth ranges (preferably in millimeters (mm) though not considered limiting) and then the user can click Save button or icon when done to store the entered values.

If there are any other types of zones to draw for the particular sensor, the above steps are repeated to place the next zone and the depth setting can be adjusted for each if necessary.

Additionally, all zones can be cleared by clicking on or otherwise selecting the Clear All icon in the toolbar. Once all of the zones/wires are configured, you can close the window to finish or you have the option to save the zone configuration for later use.

Figure 9:
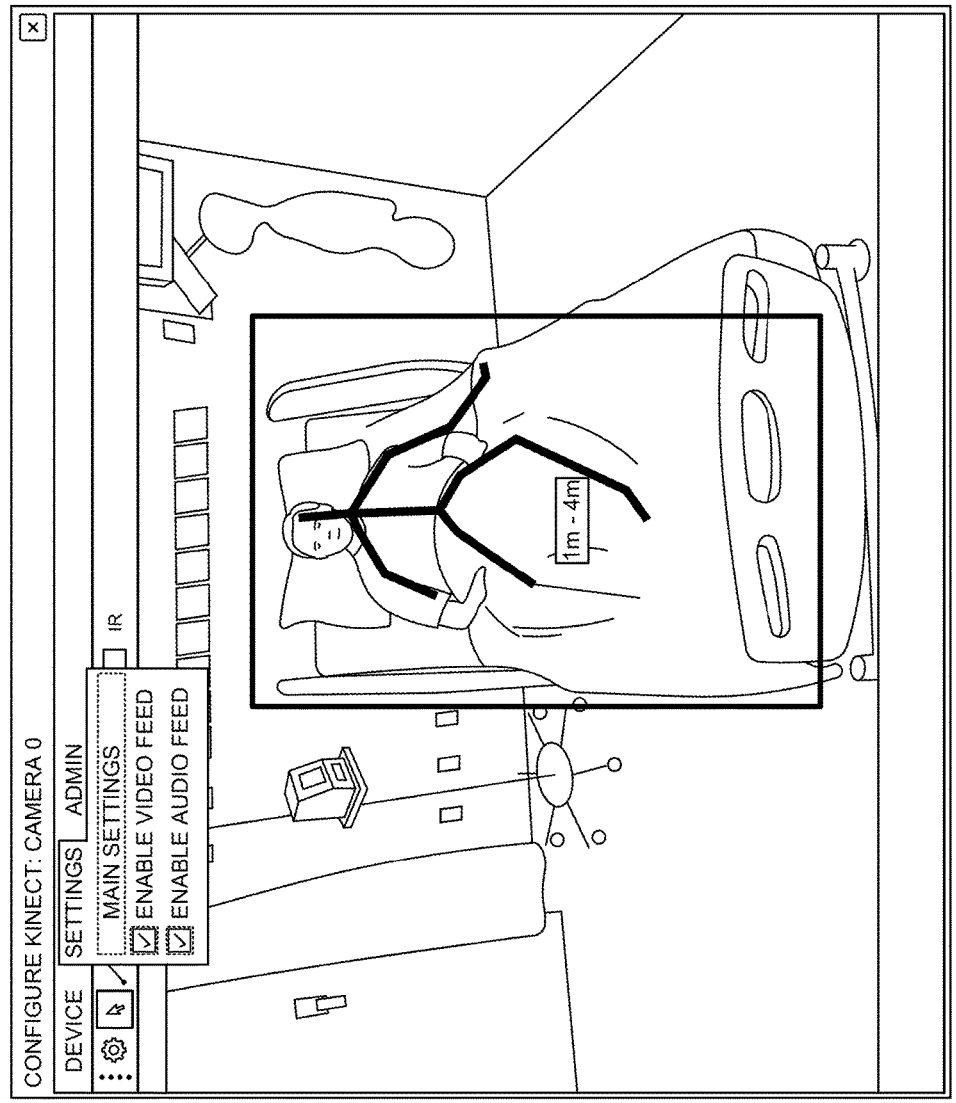

As seen in FIG. 9, to access the main settings window, the user can click or otherwise select the Settings menu and the select Main Settings from the drop-down list. As one non-limiting alternative, the user can click on the Gear icon ( ) or other designated icon in the toolbar to access the main settings window.

Figure 10:
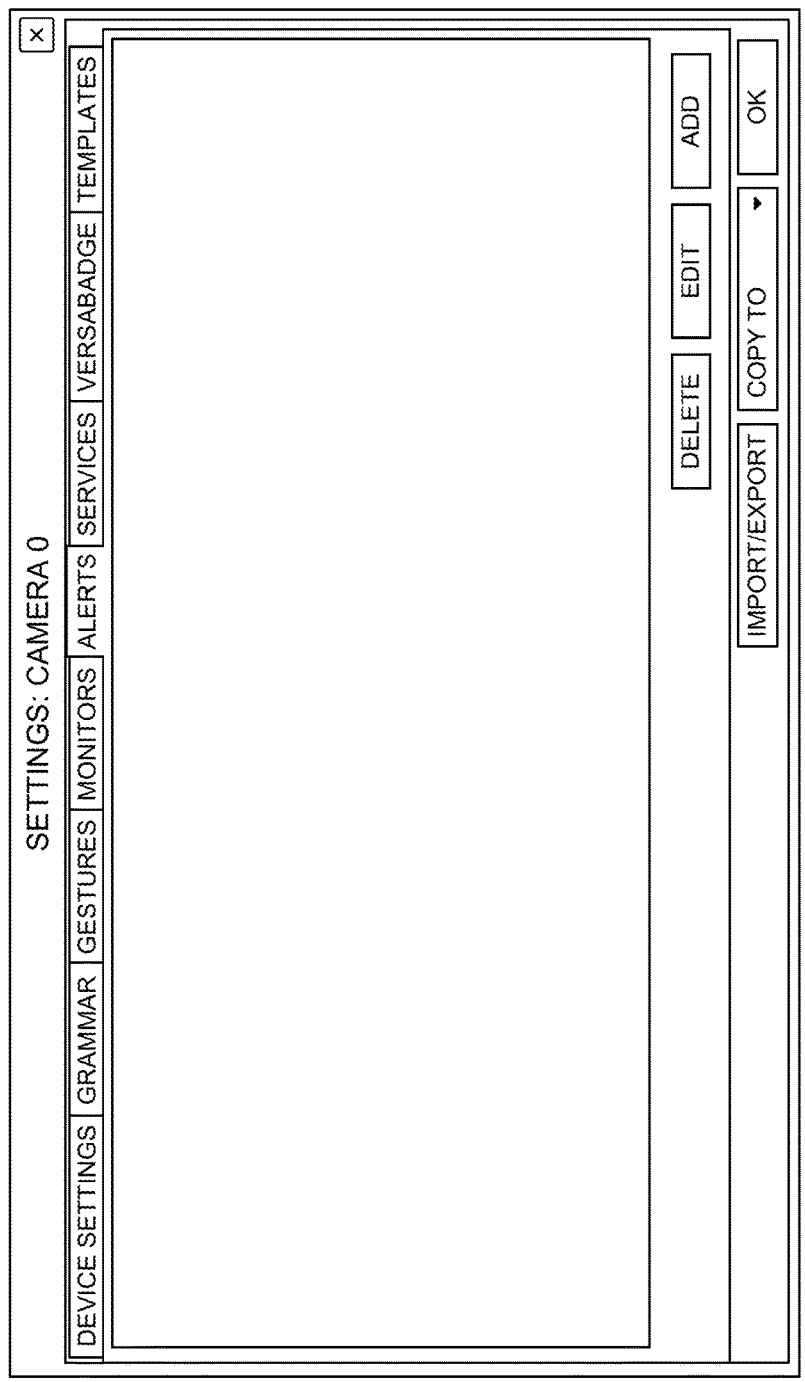
Figure 11:
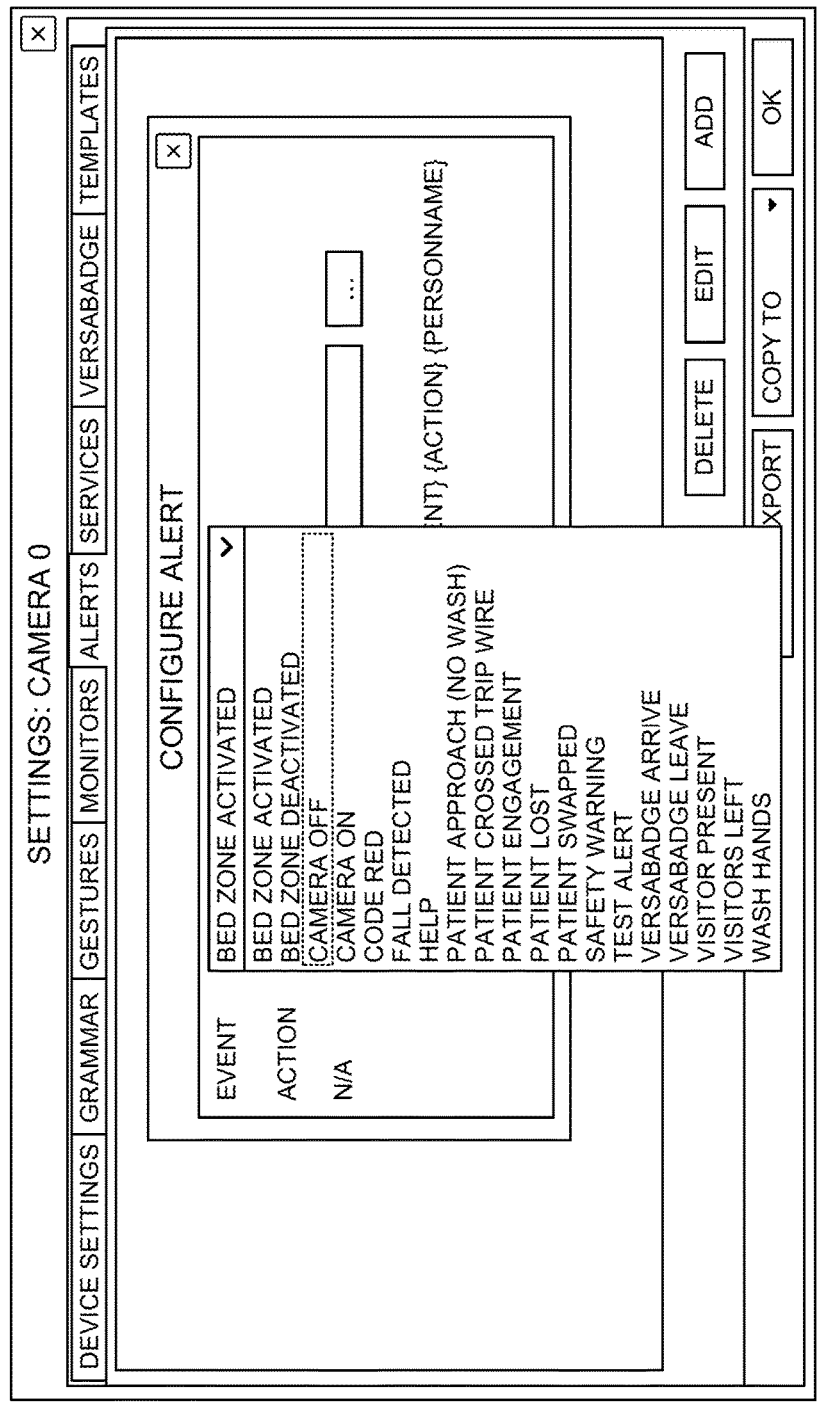

As seen in FIG. 10, for one non-limiting way to configure a new Alert, the user can select the Alerts tabs and then click on or otherwise select the Add button, which can result in the Configure Alert box appearing on the screen (See FIG. 11). As seen in FIG. 11, under the Event field, the user can then select the event from the drop down list that they wish the user wishes to send an alert on.

Figure 12:
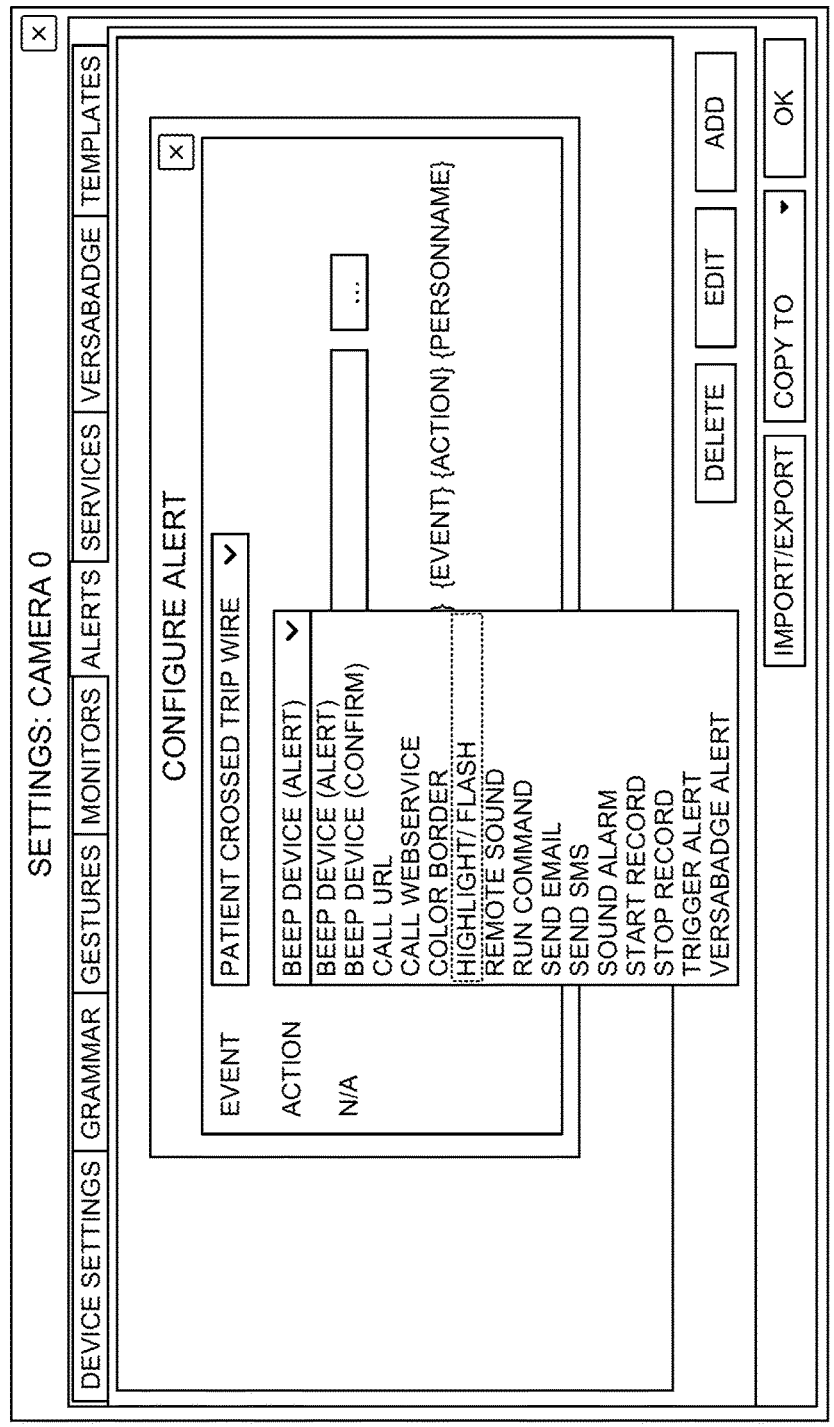
Figure 13:
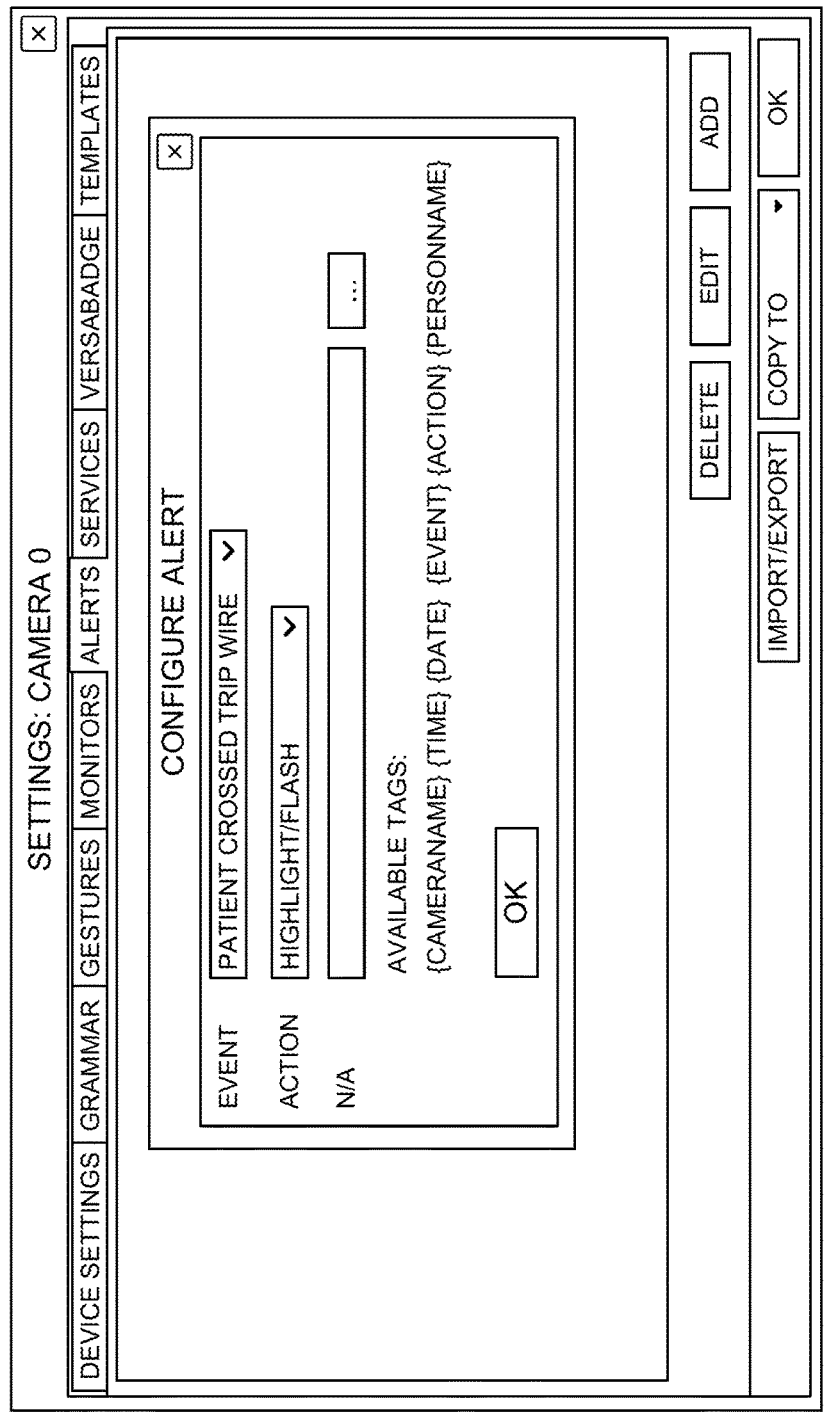
Figure 14:
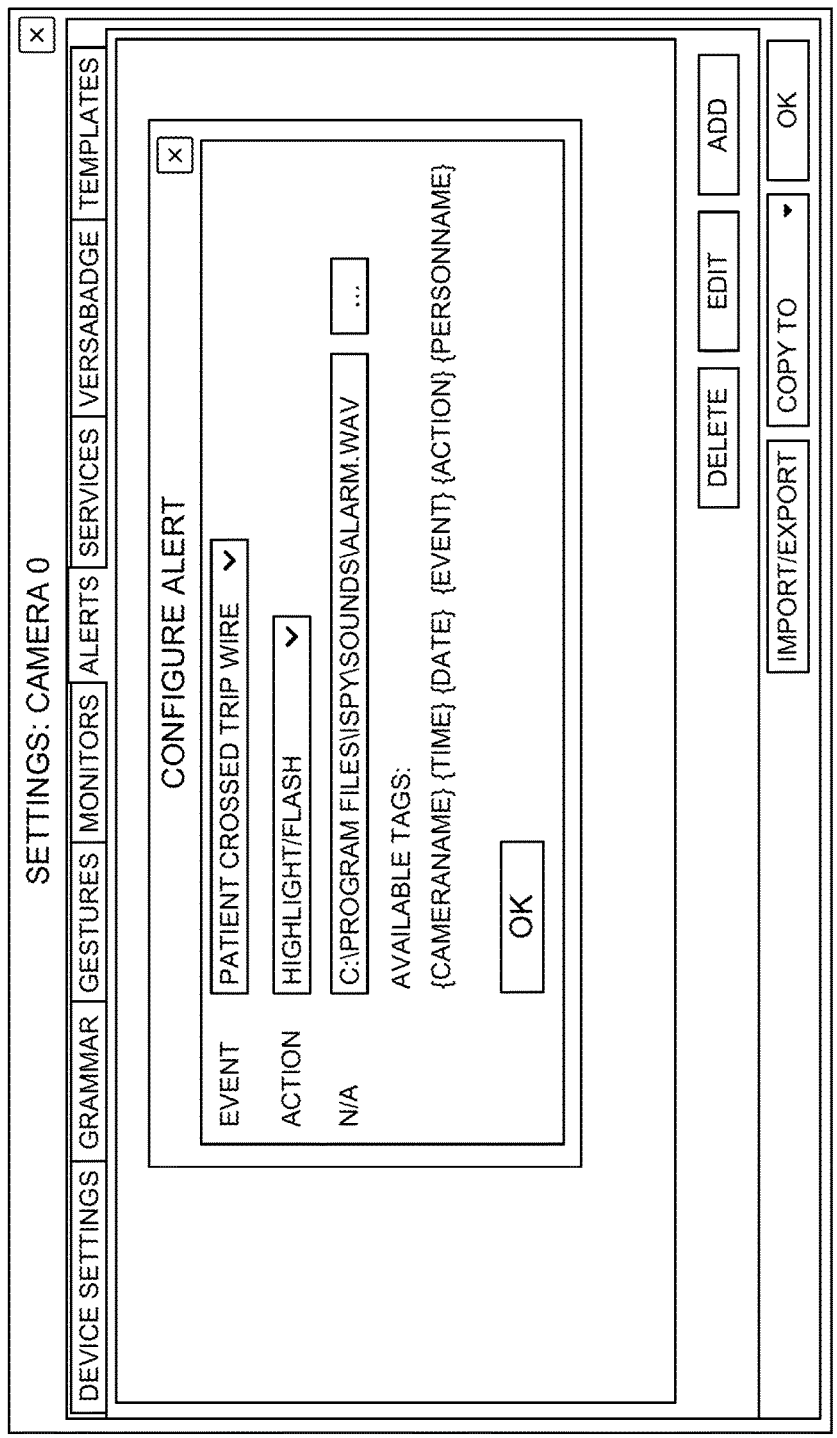
Figure 15:
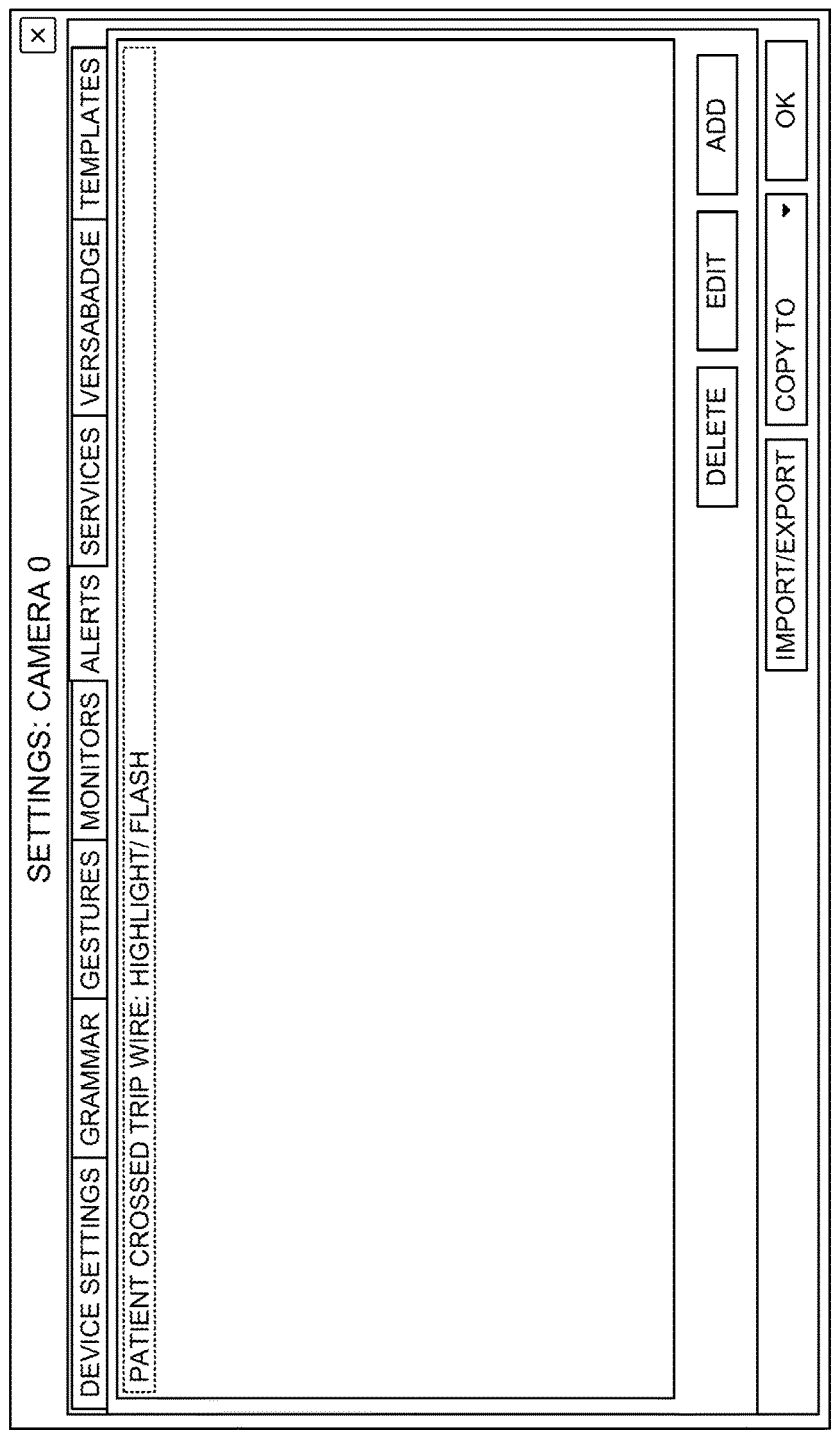

As seen in FIG. 12, once the Event type is selected, under the Action field, the user can select the Action he or she wishes to have the system perform when the selected Event is detected. Once the Event and Action have be selected the OK button (See FIG. 13) is can be selected to save the selected entries.

For certain Actions an additional field may need to be completed to finish the Action. If the field is required, it can appear below the Action dropdown (See FIG. 14). If no further fields are required, the Configure Alert box can display N/A (See FIG. 13) or just be blank. As mentioned above, once all settings are selected, the user clicks or otherwise selects the OK button, which causes the new Alert to be listed in the Alerts tab window. To edit an existing Alert, the user first clicks on or otherwise selects the Alert and then selects the Edit button (See FIG. 15). To delete an Alert, first highlight it can then click on the Delete button (See FIG. 15).

To add more Alerts, the user clicks or selects the Add button and repeats the above described steps. Once finished, the user clicks on or otherwise selects the bottom corner OK button to save and close the window.

Figure 16:
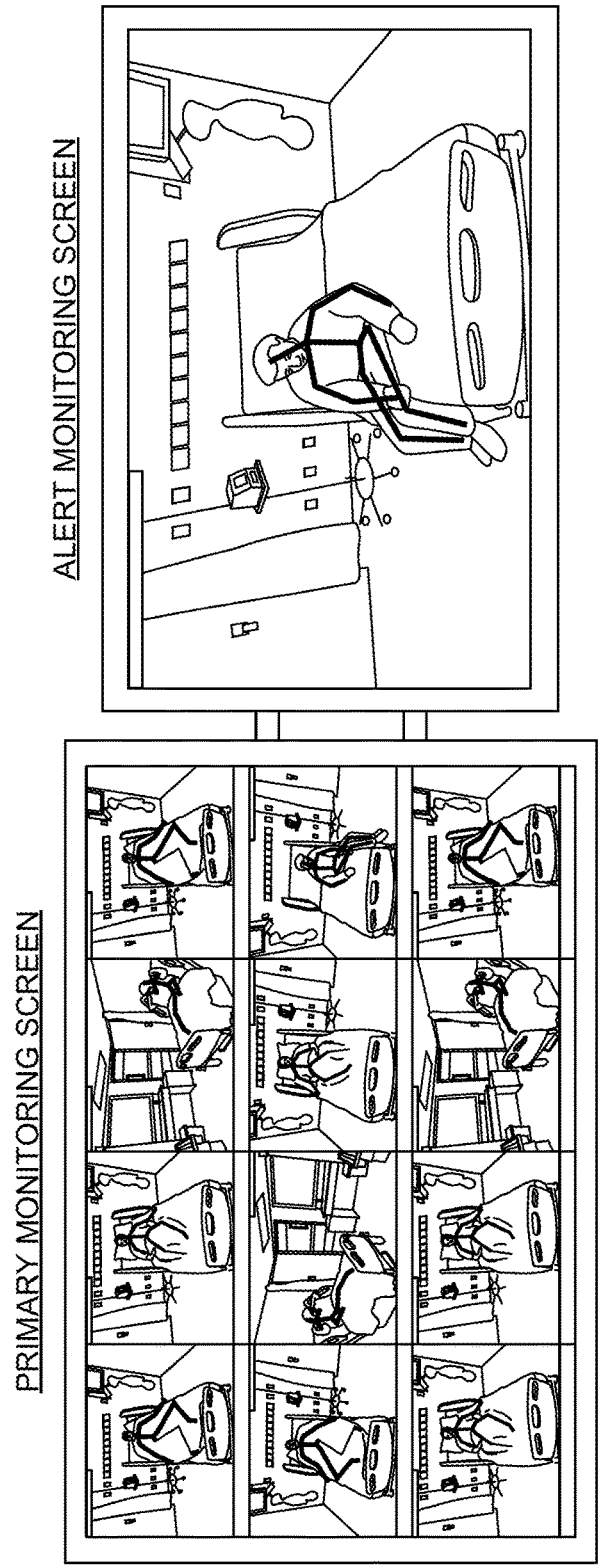
FIG. 16 is a non-limiting example of a centralized video monitoring system that can be used with the system and method shown in FIG. 1.

FIG. 16 illustrates a screen shot showing a representation of the centralized monitoring station with primary and alert displays. Preferably, the primary display always shows the patient's rooms being monitored and when one room alerts, it shows as a red bar on the primary display and then can enlarge the alerting camera to the second alert display monitor.

The above described system uses several components, including, but not limited to:
1. One or more 3D Camera, Motion and Sound sensors. However, it also within the scope of the invention to eliminate the sound sensor and have the functions of the invention be performed with only motion sensors;
2. Computerized Monitoring System in electronic communication with the one or more 3D Camera, Motion and Sound sensors;
3. Computerized Communication System in electronic communication with the Computerized Monitoring System;
4. Centralized Monitoring Station in electronic communication with one or more 3D Motion and Sound Sensors, Computerized Monitoring and Computerized Communication Systems;
5. Centralized Monitoring Primary Display in electronic communication with one or more Centralized Monitoring Stations; and/or
6. Centralized Monitoring Alert Display in electronic communication with one or more Centralized Monitoring Stations.

The various components can be in electrical, wired and/or wireless communication with each other.

The automatic detection and confirmation of a falling incident for an individual will provide significant administrative and clinical benefits to caregivers and individuals alike, including, but not limited to, the following public benefits and advantages:

1. Automation of fall detection and notification of caregivers or other designated entities.
2. Reduction in response time for individuals who have fallen and require assistance.
3. Increased survival rate for individuals who have experienced a fall
4. Reduction in costs for hospitalization and medical care related to complications from a fall Any computer/server/electronic database system (collectively "Computer System") capable of being programmed with the specific steps of the present invention can be used and is considered within the scope of the invention. Once programmed such Computer System can preferably be considered a special purpose computer limited to the use of two or more of the above particularly described combination of steps (programmed instructions) performing two or more of the above particularly described combination of functions.

All components of the described system and their locations, electronic communication methods between the system components, electronic storage mechanisms, electronic notification technologies, etc. discussed above or shown in the drawings, if any, are merely by way of example and are not considered limiting and other component(s) and their locations, electronic communication methods, electronic storage mechanisms, electronic notification technologies, etc. can be chosen and used and all are considered within the scope of the disclosure.

Unless feature(s), part(s), component(s), characteristic(s) or function(s) described in the specification or shown in the drawings for a claim element, claim step or claim term specifically appear in the claim with the claim element, claim step or claim term, then the inventor does not consider such feature(s), part(s), component(s), characteristic(s) or function(s) to be included for the claim element, claim step or claim term in the claim when and if the claim element, claim step or claim term is interpreted or construed. Similarly, with respect to any "means for" elements in the claims, the inventor considers such language to require only the minimal amount of features, components, steps, or parts from the specification to achieve the function of the "means for" language and not all of the features, components, steps or parts describe in the specification that are related to the function of the "means for" language.

While the system and method have been described and disclosed in certain terms and has disclosed certain embodiments or modifications, persons skilled in the art who have acquainted themselves with the invention, will appreciate that it is not necessarily limited by such terms, nor to the specific embodiments and modification disclosed herein. Thus, a wide variety of alternatives, suggested by the teachings herein, can be practiced without departing from the spirit of the disclosure, and rights to such alternatives are particularly reserved and considered within the scope of the disclosure.

What is claimed is:

1. A method for detecting when a monitored individual within a dwelling has fallen or otherwise indicated that he or she needs medical assistance, said method comprising the steps of:
   (a) providing one or more 3D motion and sound sensors within one or more rooms of a dwelling occupied by an individual;
   (b) configuring the one or more sensors to recognize one or more biometric identifiers of the individual using RF-modulated light;
   (c) continually capturing data by the 3D motion and sound sensors concerning the one or more rooms regardless of whether any movements or sounds have occurred in the one or more rooms;
   (d) continually forwarding the data to a computerized monitoring system by the one or more sensors prior to the individual falling or making a gesture corresponding to a pre-programmed gesture recognizable by the computerized monitoring system; and
   (e) contacting the individual or caregiver from a computerized communication system in communication with the computerized monitoring system when the computerized monitoring system detects from the data forwarded from the one or more sensors that the individual has fallen or gestured that he or she needs assistance.

2. The method of claim 1 further comprising the step of updating a database in communication with the computerized monitoring system regarding the detection of a fall or gesture by the individual.

3. The method of claim 1 further comprising the step of notifying a previously designated contact by an electronic message of the detected fall or gesture from the monitored individual after determining that the individual has fallen or gestured in step (d).

4. The method of claim 1 wherein the data comprises video and 3D depth data.

5. The method of claim 1, wherein the dwelling is a temporary residence.

6. The method of claim 5, wherein the dwelling is a hospital room.

7. A method for monitoring a designated individual in a dwelling in order to detect when such individual falls or otherwise is in need of medical assistance, said method comprising the steps of:
   (a) continually receiving by a computerized monitoring system data from one or more 3D motion and sound sensors located within a dwelling prior to an individual located in the dwelling falling or making a gesture corresponding to a pre-programmed gesture recognizable by the computerized monitoring system, wherein the one or more sensors continually capture data concerning the one or more rooms and are configured to recognize one or more biometric identifiers of an individual previously designated for monitoring while within the dwelling using RF-modulated light;
   (b) detecting from the data received from the one or more sensors that the individual has fallen or has made a gesture corresponding to a pre-programmed gesture by the computerized monitoring system; and
   (c) contacting the individual or a caregiver by a computerized communication system to determine whether the individual needs assistance sent to the dwelling after detecting that the individual has fallen or made the gesture.

8. The method of claim 7 further comprising the step of receiving information from the individual as to whether or not to send assistance to the dwelling.

9. The method of claim 8 further comprising the step of notifying a previously designated caregiver when the individual indicates that he or she needs assistance.

10. The method of claim 8 further comprising the step of notifying emergency personnel when the individual indicates that he or she needs assistance.

11. The method of claim 8 further comprising the step of remaining in contact with the individual for a period of time after the individual indicates he or she does not need assistance to be sent to the dwelling until the system has reconfirmed that assistance is not required.

12. The method of claim 7 further comprising the step of updating a database in communication with the computerized monitoring system regarding the detection of a fall or gesture by the individual.

13. A method for monitoring a designated individual in a dwelling in order to detect when such individual falls or otherwise is in need of medical assistance, said method comprising the steps of:
   (a) continually receiving by a computerized monitoring system data from one or more 3D motion and sound sensors located within a dwelling prior to an individual located in the dwelling falling or making a gesture corresponding to a pre-programmed gesture recognizable by the computerized monitoring system and regardless of whether there is any movement or sound occurring in the dwelling, wherein the one or more sensors are configured to recognize one or more biometric identifiers of an individual previously designated for monitoring while within the dwelling using RF-modulated light;
   (b) detecting from the data received from the one or more sensors that the individual has fallen or has made a gesture corresponding to a pre-programmed gesture by the computerized monitoring system;
   (c) contacting the individual by a computerized communication system to determine whether the individual needs assistance sent to the dwelling after detecting that the individual has fallen or made the gesture;
   (d) receiving information from the individual as to whether or not to send assistance to the dwelling; and
   (e) notifying a previously designated caregiver when the individual indicates that he or she needs assistance in step (d).

14. The method of claim 13 further comprising the step of notifying emergency personnel when the individual indicates that he or she needs assistance.

15. The method of claim 13 further comprising the step of updating a database in communication with the computerized monitoring system regarding the detection of a fall or gesture by the individual.

16. The method of claim 13 further comprising the step of remaining in contact with the individual for a period of time after the individual indicates he or she does not need assistance to be sent to the dwelling until the system has reconfirmed that assistance is not required.

17. A method for electronically capturing and electronically forwarding data from one or more rooms of a dwelling for use in automatically detecting when a monitored individual within the dwelling has fallen or otherwise indicated that he or she needs medical assistance, said method comprising the steps of:
   (a) providing one or more 3D motion and sound sensors within one or more rooms of a dwelling occupied by an individual who is to be monitored using RF-modulated light;
   (b) electronically capturing data by the 3D motion and sound sensors concerning the one or more rooms regardless of whether any movements or sounds have occurred in the one or more rooms and independent of and prior to any determination by a computerized monitoring system that the monitored individual has fallen or made a hand gesture; and
   (c) electronically forwarding the data to the computerized monitoring system by the one or more sensors prior to the individual falling or making a gesture corresponding to a pre-programmed gesture recognizable by the computerized monitoring system to allow the computerized monitoring system to continually monitor the data sent by the 3D motion and sound sensors.

18. A method for continually monitoring a designated individual in a dwelling in order to automatically detect when such individual falls or otherwise is in need of medical assistance, said method comprising the steps of:
   (a) receiving by a computerized monitoring system data from one or more 3D motion and sound sensors located within a dwelling independent of and prior to an individual located in the dwelling falling or making a gesture corresponding to a pre-programmed gesture recognizable by the computerized monitoring system, wherein the one or more sensors capture and forward data concerning images of the one or more rooms, wherein the computerized monitoring system can be configured to recognize one or more biometric identifiers of an individual previously designated for monitoring while within the dwelling using RF-modulated light, said one or more biometric identifiers including distance points on a body of the individual;
   (b) continually monitoring data being sent from the one or more 3D motion and sound sensors by the computerized monitoring system; and
   (c) detecting from the data received from the one or more 3D Motion and Sound sensors that the individual has fallen or has made a gesture corresponding to a pre-programmed gesture by the computerized monitoring system.

19. The method of claim 18 further comprising the step of contacting the individual by a computerized communication system to determine whether the individual needs assistance after detecting that the individual has fallen or made the gesture by the computerized monitoring system in step (c).

20. The method of claim 19 further comprising the step of notifying a previously designated caregiver when the individual indicates that he or she needs assistance.

* * * * *